T. McCULLOUGH.
ARTIFICIAL TOOTH.
APPLICATION FILED JUNE 17, 1910.
988,581.
Patented Apr. 4, 1911.
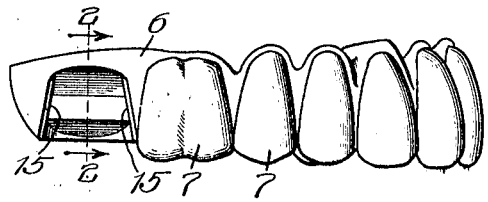
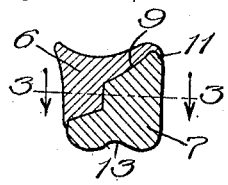 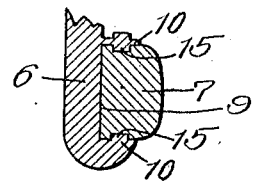
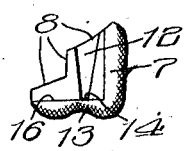 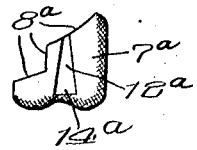

UNITED STATES PATENT OFFICE.

THOMAS McCULLOUGH, OF KANSAS CITY, MISSOURI.

ARTIFICIAL TOOTH.

988,581.

Specification of Letters Patent. Patented Apr. 4, 1911.

Application filed June 17, 1910. Serial No. 567,474.

*To all whom it may concern:*

Be it known that I, THOMAS MCCULLOUGH, a citizen of the United States, residing at Kansas City, in the county of Jackson and State of Missouri, have invented new and useful Improvements in Artificial Teeth, of which the following is a full, clear, concise, and exact description, reference being had to the accompanying drawing, forming a part of this specification.

My invention relates to improvements with artificial teeth and has for its object the production of a device that can be inserted singly in place or combined in sets in such a manner as to remain permanently when placed in proper position.

Other advantages in construction and use as will be hereinafter set forth are attained by my device embodiments of which are illustrated in the accompanying drawings in which;

Figure 1 represents a side elevation of a plate showing one tooth removed. Fig. 2 represents a sectional view on a line 2—2 of Fig. 1 with the tooth in place. Fig. 3 represents a sectional view on the line 3—3 of Fig. 2 looking in the direction indicated by the arrows. Fig. 4 represents a side elevation of a tooth showing a tapering groove. Fig. 5 represents a side elevation of a tooth showing a modified form of groove.

Referring now to the drawing, 6 represents a plate in which are inserted a plurality of teeth, 7 7$^a$. These teeth are formed with back bearing faces, 8 8$^a$, adapted to fit within and bear against a socket 9, the upper and rear faces of which are contoured to receive the back bearing faces of the tooth. This socket is open at the front and bottom but provided with side walls 10, and at the top of the front with a rim or flange 11. The front and bottom being open the tooth can be slipped in place, flange 11 fitting over the top thereof and giving it a firm bearing in the socket.

In the patent issued to me April 13, 1909, No. 917,886, I disclosed the tooth construction in connection with side grooves cut in the porcelain or like material from which the tooth can be formed. I find, however, that a simple groove, such as illustrated, in my previous application will not serve to produce the best type of a finished article as in the event of the loosening of the tooth body within the socket, the tooth is liable to drop out. I have, therefore, in my present invention provided the tooth body with grooves or pockets 12 12$^a$ extending on either side of the tooth from the top or gum line to within a short distance of the grinding surface 13, and terminating at its lower end in a seat or abutment 14 14$^a$. I may if I desire, form the tooth body with a shoulder 16, adapted to form a base for the edge of the socket when the tooth is in place.

In Fig. 4 I have shown as a modification the groove wide at the top and narrowing outward at the bottom or abutment 14, while in Fig. 5 I have shown the groove narrow at the top or gum line and widening out at the bottom 14$^a$. Along the side walls of the socket are ribs 15 adapted to fit the grooves 12, 12$^a$. The form of tooth illustrated in Fig. 5 is especially adapted for use with rubber plates.

My invention is applicable for use with single teeth, with teeth on a bridge, or with a full set on a plate. When only a single tooth is needed, the socket is placed within the recess between the teeth and fixed in any well known manner, and the tooth after being adjusted carefully to fit within the socket is slipped into position and cemented permanently in place, the rib on the socket fitting within the groove on the tooth body. In plate work the sockets are cast or molded in proper position and the tooth fitted as noted above. I find that platinum is especially well adapted for use in making the sockets, but I do not limit myself to such metals as there are many other metals that will suit the purpose.

What I claim as new and desire to secure by Letters Patent, is—

1. In an artificial tooth the combination of a body member and a socket adapted to inclose said member at the base, rear and sides and expose same at the front and free end, a rim on such base adapted to project over a portion of the exposed front of said body member, said body member being provided with tapering side grooves, and said socket being provided with tapering ribs adapted for seating in said grooves when the parts are assembled.

2. An artificial tooth comprising a body member having tapering side grooves opening through its root end, and a transverse peripheral shoulder for abutment against the free end of a socket, whereby said socket and tooth may be rigidly held together, 3. As a new article of manufacture, an artificial metallic tooth socket, tapering ribs on the inner surface of the sides of said socket, and a tooth provided with tapering grooves adapted to receive the ribs of said socket.

In witness whereof, I have hereunto subscribed my name in the presence of two witnesses.

THOMAS McCULLOUGH.

Witnesses:
FRANCES FOX,
GEORGE W. MICKLE.